(12) United States Patent
Du et al.

(10) Patent No.: US 12,705,512 B2
(45) Date of Patent: Aug. 11, 2026

(54) CONSTRUCTION METHOD AND DEVICE OF CHEMICAL ENGINEERING KNOWLEDGE GRAPH AND INTELLIGENT QUESTION ANSWERING METHOD AND DEVICE

(71) Applicant: EAST CHINA UNIVERSITY OF SCIENCE AND TECHNOLOGY, Shanghai (CN)

(72) Inventors: Wenli Du, Shanghai (CN); Yang Tang, Shanghai (CN); Bing Wang, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 34 days.

(21) Appl. No.: 18/556,617

(22) PCT Filed: Mar. 30, 2022

(86) PCT No.: PCT/CN2022/083978
§ 371 (c)(1),
(2) Date: Apr. 16, 2024

(87) PCT Pub. No.: WO2022/222716
PCT Pub. Date: Oct. 27, 2022

(65) Prior Publication Data

US 2024/0256924 A1 Aug. 1, 2024

(30) Foreign Application Priority Data

Apr. 21, 2021 (CN) .......................... 202110431113.7

(51) Int. Cl.
*G06F 16/3329* (2025.01)
*G06F 40/295* (2020.01)
(Continued)

(52) U.S. Cl.
CPC ............... *G06N 5/04* (2013.01); *G06N 5/022* (2013.01)

(58) Field of Classification Search
CPC ................................. G06N 5/04; G06N 5/022
See application file for complete search history.

(56) References Cited

U.S. PATENT DOCUMENTS

2018/0232443 A1 8/2018 Delgo et al.
2019/0019088 A1* 1/2019 Wang .................... G06N 5/022

FOREIGN PATENT DOCUMENTS

CN 107491555 A 12/2017
CN 108268581 A 7/2018
(Continued)

OTHER PUBLICATIONS

C. De Maio, G. Fenza, M. Gallo, V. Loia and A. Volpe, "Cross-relating heterogeneous Text Streams for Credibility Assessment," 2020 IEEE Conference on Evolving and Adaptive Intelligent Systems (EAIS), Bari, Italy, 2020, pp. 1-8, doi: 10.1109/EAIS48028.2020.9122701. (Year: 2020) (Year: 2020).*
(Continued)

*Primary Examiner* — Kamran Afshar
*Assistant Examiner* — Steven Phung
(74) *Attorney, Agent, or Firm* — HSML.P.C.

(57) ABSTRACT

The disclosure relates to a construction method and device for a chemical knowledge graph, an intelligent question answering method and device for chemical knowledge, and two computer-readable storage media. The construction method comprises the following steps: obtaining knowledge data in chemical industry field; pre-processing the knowledge data to obtain entity data and property data related to chemical knowledge; determining a preliminary knowledge representation according to the entity data and the property data; performing entity alignment on the preliminary knowl-
(Continued)

edge representation to obtain a standard knowledge representation; and constructing the chemical knowledge graph according to the standard knowledge representation. The construction method for a chemical knowledge graph can automatically collect relevant knowledge in the chemical industry to construct a chemical knowledge graph on basis of natural language processing, big data and artificial intelligence technology, thereby greatly improving the construction speed of the chemical knowledge graph and reducing the manual construction cost of the chemical knowledge graph.

14 Claims, 2 Drawing Sheets

(51) Int. Cl.
*G06N 5/022* (2023.01)
*G06N 5/04* (2023.01)

(56) References Cited

FOREIGN PATENT DOCUMENTS

| | | | | |
|---|---|---|---|---|
| CN | 109492077 A | | 3/2019 | |
| CN | 110008353 A | | 7/2019 | |
| CN | 110597969 A | * | 12/2019 | G06F 16/3329 |
| CN | 110837550 A | | 2/2020 | |
| CN | 111339267 A | * | 6/2020 | G06F 16/3329 |
| CN | 111613277 A | * | 9/2020 | |
| CN | 112100351 A | | 12/2020 | |
| CN | 112182252 A | * | 1/2021 | G06F 16/3329 |
| CN | 112258044 A | * | 1/2021 | |
| CN | 112287095 A | * | 1/2021 | |
| CN | 112463926 A | | 3/2021 | |
| CN | 112948566 A | | 6/2021 | |
| CN | 113821588 A | * | 12/2021 | |

OTHER PUBLICATIONS

International Search Report issued for International Patent Application No. PCT/CN2022/083978, Date of mailing: Aug. 4, 2022, 6 pages including English translation.

First Office Action issued for Chinese Patent Application No. 202110431113.7, dated May 24, 2023, 21 pages including English machine translation.

Zixuan, Z. et al., "Construction and application of an intelligent question answering system for water conservancy information resources," Computers and Modernization, Issue 3, 2020, pp. 65-71 (20 pages including English machine translation).

* cited by examiner

CONSTRUCTION METHOD AND DEVICE OF CHEMICAL ENGINEERING KNOWLEDGE GRAPH AND INTELLIGENT QUESTION ANSWERING METHOD AND DEVICE

TECHNICAL FIELD

The disclosure relates to knowledge graph and natural language processing technical fields, in particular to a construction method for a chemical knowledge graph, a construction device for a chemical knowledge graph, an intelligent question answering method for chemical knowledge, an intelligent question answering device for chemical knowledge, and two computer-readable storage media.

BACKGROUND

Chemical industry is one of the key emerging industries in our country. With the improvement of economic development level in China, the technical equipment level of the chemical industry is also improving. This creates conditions for enterprises to reduce energy consumption, reduce pollution and improve efficiency. At the same time, through the comprehensive utilization of resources and energy, good economic and social benefits have been achieved. However, the chemical industry is also one of the more dangerous industries in China, and the consequences of chemical accidents directly affect the personal safety of people and the economic and property safety of the country.

Due to the wide range, variety and large quantity of knowledge in the chemical field, it is difficult for those skilled in the art to fully grasp the relevant knowledge of all branches. Once encountering an emergency, those skilled in the art often do not know how to handle it. In response to this issue, some existing technologies have provided some intelligent question answering proposals according to retrieval technology or deep learning matching technology. However, these existing technologies do not involve knowledge in the chemical field, making it difficult to directly apply them to the chemical field. Besides, these existing technologies are unable to efficiently respond to the wide range, variety and large quantity of knowledge in the chemical industry, often being unable to understand the real needs of users, and being unable to truly solve their problems in the chemical industry.

Therefore, a complete, accurate and efficient chemical knowledge management technology is urgently needed in this field, to provide related explanations and solutions to the problems faced by those skilled in the art of chemical industry in real time, so as to better assist those skilled in the art in making decisions, and quickly solve some complex chemical problems, thereby reducing the incidence of safety accidents, and better ensuring the personal safety of the people and the economic and property safety of the enterprises and the country.

SUMMARY

A brief overview of one or more aspects is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to better ensure the personal safety of the people and the economic and property safety of the country, the disclosure provides a construction method for a chemical knowledge graph, a construction device for a chemical knowledge graph, an intelligent question answering method for chemical knowledge, an intelligent question answering device for chemical knowledge and two computer-readable storage media.

The construction method for a chemical knowledge graph, according to the first aspect of the disclosure, comprises following steps: obtaining a knowledge data in chemical field; pre-processing the knowledge data to obtain an entity data and a property data related to chemical knowledge; determining a preliminary knowledge representation according to the entity data and the property data; performing entity alignment on the preliminary knowledge representation to obtain a standard knowledge representation; and constructing the chemical knowledge graph according to the standard knowledge representation. On basis of natural language processing, big data and artificial intelligence technology, the construction method for a chemical knowledge graph can automatically collect relevant knowledge in the chemical industry to construct a chemical knowledge graph, thereby greatly improving the construction speed of the chemical knowledge graph, and reducing the manual construction cost of the chemical knowledge graph.

Preferably, in some embodiments of the disclosure, the knowledge data comprises a structured data, a semi-structured data and/or an unstructured data. Steps of pre-processing the knowledge data comprise: integrating the structured data to obtain the entity data and the property data related to chemical knowledge; and/or performing knowledge extraction on the semi-structured data and/or the unstructured data to obtain the entity data and the property data related to chemical knowledge.

Preferably, in some embodiments of the disclosure, the property data comprises a numeric property data and a relation property data. The numeric property data is used to describe a property value of one entity data in the same preliminary knowledge representation. The relation property data is used to describe a relationship between two entity data in the same preliminary knowledge representation.

Preferably, in some embodiments of the disclosure, step of determining a preliminary knowledge representation according to the entity data and the property data comprises: constructing a preliminary knowledge representation in a triplet form according to the obtained entity data and property data in a form of entity—numeric property—property value, or first entity—relation property—second entity.

Optionally, in some embodiments of the disclosure, steps of performing entity alignment on the preliminary knowledge representation to obtain a standard knowledge representation comprise: analyzing a plurality of the preliminary knowledge representations to determine a plurality of different entity data indicating the same chemical entity; and decomposing the plurality of different entity data indicating the same chemical entity into the same entity data to obtain the standard knowledge representation that utilizes the same entity data to indicate the same chemical entity.

Optionally, in some embodiments of the disclosure, steps of constructing the chemical knowledge graph according to the standard knowledge representation comprise: performing knowledge discovery according to the entity data and the property data of the plurality of standard knowledge representations to obtain at least one high-credibility standard knowledge representation; performing knowledge inference according to the entity data and the property data of the plurality of standard knowledge representations to obtain a plurality of standard knowledge representations with unknown credibility; evaluating the quality of the plurality of standard knowledge representations with unknown credibility to determine the high-credibility standard knowledge representation thereof; and constructing the chemical knowledge graph according to each of the high-credibility standard knowledge representation.

Preferably, in some embodiments of the disclosure, steps of evaluating the quality of the plurality of standard knowledge representations with unknown credibility comprise: performing text matching between the plurality of standard knowledge representations with unknown credibility and the knowledge data in chemical field to obtain a text matching degree of each standard knowledge representation; and determining the standard knowledge representation with the text matching degree that is higher than a preset matching degree threshold as the high-credibility standard knowledge representation.

The construction device for a chemical knowledge graph according to the second aspect of the disclosure, comprises a memory and a processor. The processor is connected to the memory and configured to implement the construction method of the chemical knowledge graph according to the first aspect of the disclosure. By implementing this construction method, the construction device for a chemical knowledge graph can automatically collect relevant knowledge in the chemical industry, on basis of natural language processing, big data and artificial intelligence technology, to construct a chemical knowledge graph, thereby greatly improving the construction speed of the chemical knowledge graph, and reducing the manual construction cost of the chemical knowledge graph.

The computer-readable storage medium according to the third aspect of the disclosure, stores computer instructions thereon. When the computer instructions are executed by a processor, the construction method for a chemical knowledge graph according to the first aspect of the disclosure is implemented. By implementing this construction method, the computer-readable storage medium can automatically collect relevant knowledge in the chemical industry, on basis of natural language processing, big data and artificial intelligence technology, to construct a chemical knowledge graph, thereby greatly improving the construction speed of the chemical knowledge graph, and reducing the manual construction cost of the chemical knowledge graph.

The intelligent question answering method for chemical knowledge, according to the fourth aspect of the disclosure, comprises following steps: obtaining a question raised by a user; pre-processing the question, identifying a question entity data and a question property data related to chemical knowledge thereof, and identifying an intention of the question; determining a first graph entity data associated with the question entity data from each graph entity data of a chemical knowledge graph, wherein the chemical knowledge graph is constructed by the construction method for a chemical knowledge graph according to the first aspect of the disclosure; performing knowledge inference according to the first graph entity data, the intention of the question and a standard knowledge representation in the chemical knowledge graph to obtain a plurality of candidate paths; respectively calculating a text matching degree between the plurality of candidate paths and the question, and select the candidate path with a highest text matching degree as an optimal search path; and searching the chemical knowledge graph according to the optimal search path to obtain an answer corresponding to the question. Comparing with the existing technologies that perform intelligent question answering on basis of retrieval technology or deep learning matching technology, the intelligent question answering method provide intelligent question answering functions in the chemical field through the combination of chemical knowledge graph and natural language processing technology, so as to enable a more accurate understanding of the real needs of users, thereby providing more accurate and effective solutions.

Preferably, in some embodiments of the disclosure, step of identifying a question entity data and a question property data related to chemical knowledge thereof comprises: inputting the question into a pre-trained question parsing module to obtain the question entity data and the question property data related to chemical knowledge, wherein the question parsing module is a deep learning model trained on question samples according to chemical knowledge.

Preferably, in some embodiments of the disclosure, the question parsing module comprises an entity link dictionary and a property dictionary. Steps of identifying a question entity data and a question property data related to chemical knowledge thereof further comprise: inputting the obtained question entity data into the entity link dictionary, and mapping the question entity data to data consistent with the description of the chemical knowledge graph according to synonyms and/or machine learning fuzzy matching; and inputting the obtained question property data into the property dictionary, and mapping the question property data to data consistent with the description of the chemical knowledge graph according to synonyms and/or machine learning fuzzy matching.

Optionally, in some embodiments of the disclosure, steps of identifying an intention of the question comprise: in response to identifying a question entity data related to chemical knowledge and a corresponding question property data from the question, determining that the intention of the question is to retrieve a corresponding second entity according to a first entity and a property; and in response to identifying two question entity data related to chemical knowledge from the question, determining that the intention of the question is to retrieve a corresponding property according to the first entity and the second entity.

Optionally, in some embodiments of the disclosure, steps of respectively combining the first graph entity data with each of the second graph property data or each of the second graph entity data to obtain the plurality of candidate paths comprise: in response to the intention of the question is to retrieve the corresponding second entity according to the first entity and the property, respectively combining the first graph entity data with each of the selected second graph property data to obtain the plurality of candidate paths; and in response to the intention of the question is to retrieve the corresponding property according to the first entity and second entity, respectively combining the first graph entity data with each of the selected second graph entity data to obtain the plurality of candidate paths.

Preferably, in some embodiments of the disclosure, steps of selecting all second graph property data or second graph entity data related to the first graph entity data, according to the intention of the question and the standard knowledge representation in the chemical knowledge graph comprise: in response to the intention of the question is to retrieve the corresponding second entity according to the first entity and the property, selecting all second graph property data related to the first graph entity data according to the standard knowledge representation in the chemical knowledge graph; and in response to the intention the question is to retrieve the corresponding property according to the first entity and the second entity, selecting all second graph entity data related to the first graph entity data according to the standard knowledge representation in the chemical knowledge graph.

Preferably, in some embodiments of the disclosure, the second graph property data related to the first graph entity data comprises the second graph property data that is once related or twice related to the first graph entity data, wherein the once related refers to the first graph entity data can be associated with the second graph property data through one standard knowledge representation, and the twice related refers to the first graph entity data can be associated with the second graph property data through two standard knowledge representations, the second graph entity data related to the first graph entity data comprises the second graph entity data that is once related or twice related to the first graph entity data, wherein the once related refers to the first graph entity data can be associated with the second graph entity data through one standard knowledge representation, and the twice related refers to the first graph entity data can be associated with the second graph entity data through two standard knowledge representations.

Optionally, in some embodiments of the disclosure, steps of respectively combining the first graph entity data with each of the second graph property data or each of the second graph entity data to obtain the plurality of candidate paths comprise: in response to the intention of the question is to retrieve the corresponding second entity according to the first entity and the property, respectively combining the first graph entity data with each of the selected second graph property data to obtain the plurality of candidate paths; and in response to the intention of the question is to retrieve the corresponding property according to the first entity and second entity, respectively combining the first graph entity data with each of the selected second graph property data to obtain the plurality of candidate paths.

Optionally, in some embodiments of the disclosure, steps of respectively calculating a text matching degree between the plurality of candidate paths and the question comprise: inputting the question into a word vector model pre-trained on basis of chemical knowledge samples to obtain a first vector of the question; respectively inputting the plurality of obtained candidate paths into the word vector model to obtain a second vector of each candidate path; and respectively calculating the cosine value between each second vector and each first vector to serve as the text matching degree between each of the candidate paths and the question.

Optionally, in some embodiments of the disclosure, steps of searching the chemical knowledge graph according to the optimal search path to obtain an answer corresponding to the question comprise: searching the chemical knowledge graph according to the optimal search path to determine a corresponding standard knowledge representation; determining a position of the answer in the standard knowledge representation according to the intention of the question; and organizing the answers according to the question to obtain the answer in a standard form.

Preferably, in some embodiments of the disclosure, the intelligent question answering method further comprising a following step: returning the answer in the standard form to the user.

The intelligent question answering device for chemical knowledge, according to the fifth aspect of the disclosure, comprises a memory and a processor. The processor is connected to the memory and configured to implement the intelligent question answering method for chemical knowledge according to the fourth aspect of the disclosure. By implementing the intelligent question answering method for chemical knowledge, the intelligent question answering device can provide intelligent question answering functions in the chemical field through the combination of chemical knowledge graph and natural language processing technology, so as to enable a more accurate understanding of the real needs of users, thereby providing more accurate and effective solutions.

The computer-readable storage medium according to the sixth aspect of the disclosure, stores computer instructions thereon. When the computer instructions are executed by the processor, the intelligent question answering method of the chemical knowledge according to the fourth aspect of the disclosure is implemented. By implementing the intelligent question answering method for chemical knowledge, the computer-readable storage medium can provide intelligent question answering functions in the chemical field through the combination of chemical knowledge graph and natural language processing technology, so as to enable a more accurate understanding of the real needs of users, thereby providing more accurate and effective solutions.

REFERENCE SIGNS

Figure 1:
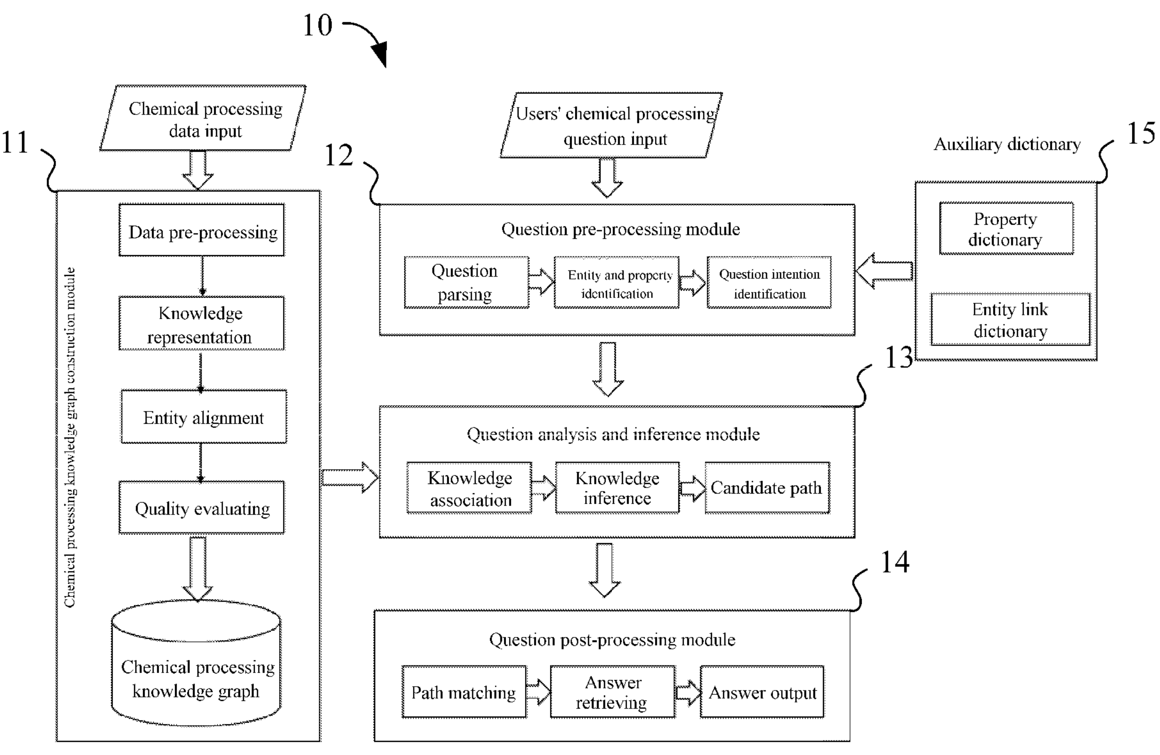
FIG. 1 shows an architecture diagram of the intelligent question answering device based on the chemical knowledge graph according to some embodiments of the disclosure.

10 intelligent question answering device;
11 chemical knowledge graph construction module;
12 question pre-processing module;
13 question analysis and inference module;
14 question post-processing module;
15 auxiliary dictionary;
S1~S14 steps

DETAILED DESCRIPTION OF EMBODIMENTS

The implementations of the disclosure are described below by specific embodiments. Those skilled in the art can easily understand other advantages and effects of the disclosure from the contents disclosed in the description. Although the description of the disclosure is introduced together with preferred embodiments, it does not mean that the features of the disclosure are limited to the embodiments. On the contrary, the purpose of introducing the disclosure in combination with the embodiments is to cover other options or modifications that may be extended based on the claims of the disclosure. In order to provide a deep understanding of the disclosure, the following description will contain many specific details. The disclosure can also be implemented without using these details. In addition, in order to avoid confusion or ambiguity of the key points of the disclosure, some specific details is omitted in the description.

In the description of the disclosure, it should be noted that, unless otherwise specified and defined, the terms “installation”, “connecting” and “connection” should be understood in a broad sense. For example, they can be fixed connection, removable connection or integrated connection; mechanical connection or electrical connection; as well as direct connection, indirect connection through intermediate media or internal connection of two components. For those skilled in the art, the specific meaning of the above terms in the disclosure can be understood in specific cases.

In addition, the words “up”, “down”, “left”, “right”, “top”, “bottom”, “horizontal” and “vertical” used in the following description should be understood as the orientation shown in this paragraph and the relevant drawings. This relative term is only for convenience of explanation, and does not mean that the described device needs to be manufactured or operated in a specific direction, so it should not be understood as a limitation of the disclosure.

It is understood that although the terms “first”, “second”, “third”, etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the disclosure.

As mentioned above, the chemical industry is currently one of the more dangerous industries in China, and the consequence of chemical accidents directly affect the personal safety of the people and the economic and property safety of the country. Due to the wide range, variety and large quantity of knowledge in the chemical field, it is difficult for those skilled in the art to fully grasp the relevant knowledge of all branches. Once encountering an emergency, those skilled in the art often do not know how to handle it. In response to this issue, some existing technologies have provided some intelligent question answering solutions on basis of retrieval technology or deep learning matching technology. However, these existing technologies do not involve knowledge in the chemical field, making it difficult to directly apply them to the field of chemical industry. Besides, these existing technologies is unable to efficiently respond to the wide range, variety and large quantity of knowledge in the chemical industry, often being unable to understand the real needs of users, and being unable to truly solve their problems in the chemical industry.

In order to better ensure the personal safety of the people and the economic and property safety of the country, the disclosure provides a concept of combining knowledge graph and natural language processing technology in the chemical field. Comparing with the existing technologies that perform intelligent question answering on basis of retrieval technology or deep learning matching technology, the disclosure can construct a knowledge graph of the chemical industry by mining data in the field, and perform inferential intelligent question answering on basis of the constructed chemical knowledge graph. Therefore, it can better assist personnel in the chemical production industry in making decisions, and quickly solve some complex problems, thereby reducing the incidence of safety accidents and better protect the benefits of the enterprises and the country.

Specifically, the disclosure provides a construction method for a chemical knowledge graph, a construction device for a chemical knowledge graph, an intelligent question answering method for chemical knowledge, an intelligent question answering device for chemical knowledge and two computer-readable storage media.

In some non-limiting embodiments, the construction method of the chemical knowledge graph according to the first aspect of the disclosure can be implemented by the construction device for the chemical knowledge graph according to the second aspect of the disclosure. The construction device can be configured with a memory and a processor. The memory comprises but is not limited to the computer-readable storage medium according to the third aspect of the disclosure, in which computer instructions are stored. The processor is connected to the memory and configured to execute computer instructions stored on the memory to implement the construction method of the chemical knowledge graph according to the first aspect of the disclosure.

Correspondingly, the intelligent question answering method for chemical knowledge according to the fourth aspect of the disclosure can be implemented by the intelligent question answering device for chemical knowledge according to the fifth aspect of the disclosure. The intelligent question answering device can also be configured with a memory and a processor. The memory comprises but is not limited to the computer readable storage medium according to the sixth aspect of the disclosure, in which computer instructions are stored. The processor is connected to the memory and configured to execute computer instructions stored on the memory to implement the intelligent question answering method for chemical knowledge according to the fourth aspect of the disclosure.

Please refer to FIG. 1. FIG. 1 shows an architecture diagram of the intelligent question answering device based on the chemical knowledge graph according to some embodiments of the disclosure.

In the embodiment shown in FIG. 1, the intelligent question answering device 10 according to the fifth aspect of the disclosure can be configured with a question pre-processing module 12, a question analysis module 13, a question post-processing module 14, an auxiliary dictionary 15 and the construction device 11 for the chemical knowledge graph according to the second aspect of the disclosure. In some embodiments, the construction device 11 is configured as a module inside the intelligent question answering device 10. In some other embodiments, the construction device 11 temporarily or permanently communicates with the intelligent question answering device 10 through communication interface connection, data line connections wireless network connection and other means from outside.

Figure 2:
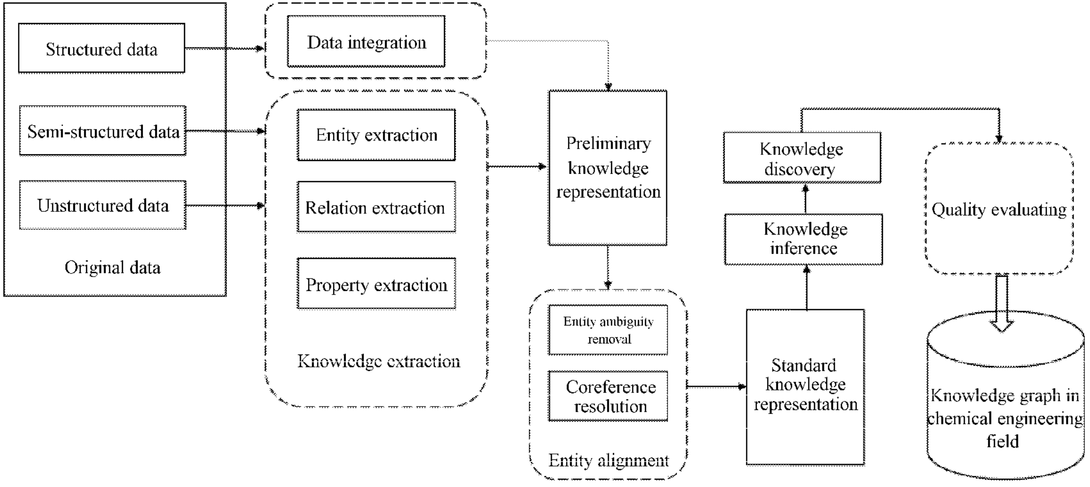
FIG. 2 shows a flowchart for constructing the chemical knowledge graph according to some embodiments of the disclosure.

Please further refer to FIG. 2. FIG. 2 shows a flowchart for constructing the chemical knowledge graph according to some embodiments of the disclosure.

As shown in FIG. 1 and FIG. 2, in the process of constructing the chemical knowledge graph, the construction device 11 can first obtain original knowledge data in the chemical field through a human-machine interaction interface, a communication interface to an external storage media, and/or a network interface. The original knowledge data can be either structured triplet data that satisfies the “subject-predicate-object” form, semi-structured data recorded in other structures, or unstructured data recorded in natural language form. In some embodiments, the original knowledge data in the chemical field mentioned above comprises but is not limited to relevant knowledge of chemical processes.

After obtaining the original knowledge data in the chemical industry field, the construction device 11 can first preprocess these original knowledge data to construct an initial dataset, and then determine a preliminary ontology knowledge representation according to the constructed initial dataset. Specifically, for triplet structured data that satisfies the “subject-predicate-object” form, the construction device

11 can associate the data, and directly add the involved entity data and property data that are related to chemical knowledge to the initial dataset as a preliminary knowledge representation of the structured data. For semi-structured data and unstructured data that do not meet the "subject-predicate-object" form, the construction device 11 needs to first perform knowledge extraction on them, extracting involved entity data and property data related to chemical knowledge, and then add the extracted entity data and property data to the initial dataset in an interrelated manner, as a preliminary knowledge representation of these semi-structured and unstructured data.

Taking unstructured data recorded in natural language form as an example:

(1) The products of coking equipment mainly comprise dry gas, liquefied gas, gasoline, diesel, wax oil and coke. The products of the coking equipment are all semi-finished products, requiring further processing by downstream devices, and with low requirements for product properties.

(2) The main cause for the high liquid level in raw material buffer tank comprise: excessive addition of raw materials, low extraction of pump P-2101, water in the raw materials or steam in the pipeline, pressure suppression resulted in blockage of the connecting line between the tank top and C-2102, and fault of the raw material pump P2101 or instruments.

(3) The cause for the low reflux flow rate at the bottom of fractionation tower C-9102 is that "Fault of the reflux flow rate control circuit FIC9133 at the bottom of fractionation tower C-9102 causes the valve FV9133 to turn down". The consequence is that "Coking at the bottom of fractionation tower C-9102 causes a fluctuation in the feed flow rate of the heating furnace, and burns through the tube of the heating furnace F-9101". The safety precaution is that "Setting a low feed flow interlock, which extinguishes the main fire nozzle of the group of heating furnaces when the feed flow rate is below 27.5 T/H, in the heating furnace F9101".

By performing knowledge extraction on the original knowledge data (1)~(3), entity data and property data related to chemical knowledge, such as "coking equipment, product, dry gas"; "coking equipment, product, liquefied gas"; "coking equipment, product, gasoline"; "excessive liquid level in raw material buffer tank, reason, excessive amount of added raw material"; "excessive liquid level in raw material buffer tank, reason, undersized extraction of pump P-2101", can be obtained, wherein "coking equipment, product, dry gas" is a preliminary knowledge representation, "coking equipment" and "dry gas" are the entity data in the preliminary knowledge representation, and "product" is the relation property data used to describe the relation property between the two entity data of "coking equipment" and "dry gas".

Those skilled in the art can understand that the above relation property data is only a non-limiting embodiment of property data and does not limit the scope of protection of the disclosure. Optionally, in some other embodiments, the above property data may also comprise numeric property data, which describes the property values of a corresponding entity data, such as "gasoline, density, 0.7~0.78".

As shown in FIG. 1 and FIG. 2, after completing the pre-processing of the original knowledge data, and obtaining a plurality of preliminary knowledge representations of each structured data, each semi-structured data and each unstructured data, the construction device 11 can carry out entity alignment on these preliminary knowledge representations to obtain a plurality of standard knowledge representations in a unified form. In some embodiments, the entity alignment of chemical knowledge mainly comprises the operation of coreference resolution, which is used to solve the problem of a plurality of property pointing to the same named entity.

For example, in the entity data of "fault of the raw material pump P-2101 or instruments" and "undersized extraction of pump P-2101", "raw material pump P-2101" and "pump P-2101" are actually the same entity. The construction device 11 can perform coreference resolution on these two entities, referring all data property and relation property related to the data of these two entities to the same entity (such as "raw material pump P-2101"), thereby solving the problem of the plurality of property pointing to the same named entity.

As shown in FIGS. 1 and 2, after completing entity alignment and obtaining the plurality of standard knowledge representations of chemical knowledge, the construction device 11 can perform knowledge discovery and knowledge inference according to these standard knowledge representations to obtain new chemical knowledge, and incorporate the new knowledge with higher reliability into the constructed chemical knowledge graph.

The above-mentioned knowledge discovery refers to the process of shielding tedious details of the original data, and identifying effective, novel, potentially useful and understandable knowledge from the dataset. The new knowledge obtained through this method often has high credibility. The above-mentioned knowledge inference refers to the process of obtaining new knowledge or conclusions that satisfy semantics through various methods. This method often obtains unexpected new knowledge, but it cannot guarantee the credibility of the new knowledge.

For example, to the standard knowledge representations for a plurality of chemical knowledge obtained after completing entity alignment:

"excessive addition of raw materials, consequence, excessive liquid level in raw material buffer tank";

"undersized extraction of raw material pump P-2101, consequence, excessive liquid level in the raw material buffer tank";

"undersized reflux flow rate at the bottom of fractionation tower C-9102, reason, fault of the reflux flow rate control circuit FIC9133 at the bottom of fractionation tower C-9102 causes the valve FV9133 to turn down";

"undersized reflux flow rate at the bottom of fractionation tower C-9102, safety precaution, setting a low feed flow interlock that extinguishes the main fire nozzle of the group of heating furnaces when the feed flow rate is below 27.5 T/H in the heating furnace F9101";

Construction device 11 can discover a new knowledge of "fault of the reflux flow rate control circuit FIC9133 at the bottom of fractionation tower C-9102 causes the valve FV9133 to turn down, safety precaution, setting a low feed flow interlock that extinguishes the main fire nozzle of the group of heating furnaces when the feed flow rate is below 27.5 T/H in the heating furnace F9101" through knowledge discovery, combined with the two standard knowledge representations of "undersized reflux flow rate at the bottom of fractionation tower C-9102, reason, fault of the reflux flow rate control circuit FIC9133 at the bottom of fractionation tower C-9102 causes the valve FV9133 to turn down" and "undersized reflux flow rate at the bottom of fractionation tower C-9102, safety precaution, setting a low feed flow interlock that extinguishes the main fire nozzle of the group of heating furnaces when the feed flow rate is below 27.5

T/H in the heating furnace F9101". Since this new knowledge is obtained by combining two known standard knowledge representations with sufficient and necessary logical relationships, it usually has high-reliability.

In addition, the construction device 11 can also infer a new knowledge of "excessive liquid level in raw material buffer tank, reason, excessive addition of raw material" according to the semantic representation of the known standard knowledge representation of "excessive addition of raw materials, consequence, excessive liquid level in raw material buffer tank"; infer a new knowledge of "excessive liquid level in raw material buffer tank, reason, undersized extraction of raw material pump P-2101" according to the semantic representation of the known standard knowledge representation of "undersized extraction of raw material pump P-2101, consequence, excessive liquid level in raw material buffer tank"; and infer a new knowledge of "excessive liquid level in raw material buffer tank, reason, excessive addition of raw materials or low extraction of raw material pump P-2101" by combining the semantic representation of the known standard knowledge representations of "excessive addition of raw materials, consequence, excessive liquid level in raw material buffer tank" and "undersized extraction of raw material pump P-2101, consequence, excessive liquid level in the raw material buffer tank", through knowledge inference. Since these new knowledge are obtained through semantic inference, their credibility often cannot be guaranteed, so further quality evaluating is needed for screening.

As shown in FIG. 1 and FIG. 2, in some embodiments of the disclosure, the construction device 11 can match the plurality of standard knowledge representations with unknown credibility, obtained through knowledge inference, with the original knowledge data, to obtain the text matching degree of each standard knowledge representation. In response to the text matching degree of "excessive liquid level in raw material buffer tank, reason, excessive addition of raw materials" and "excessive liquid level in raw material buffer tank, reason, undersized extraction of raw material pump P-2101" being lower than the pre-set matching threshold, the construction device 11 can determine it as a low credibility standard knowledge representation. On the contrary, in response to the text matching degree of "excessive liquid level in raw material buffer tank, reason, excessive addition of raw material or low extraction of raw material pump P-2101" being higher than or equal to the pre-set matching degree threshold, the construction device 11 can determine it as a high-credibility standard knowledge representation.

Afterwards, the construction device 11 can construct a chemical knowledge graph according to these high-credibility standard knowledge representations obtained through quality evaluate screening, as well as the high-credibility standard knowledge representations obtained through knowledge discovery, for the intelligent question answering device 10 for chemical knowledge to invoke.

Furthermore, in some embodiments, the construction device 11 can continuously acquire chemical knowledge data during the use of the intelligent question answering device 10 to form a new high-credibility standard knowledge representation, and add the newly formed standard knowledge representation to the constructed chemical knowledge graph in real-time to update the chemical knowledge graph. In this way, by configuring the construction device 11, the intelligent question answering device 10 can automatically collect relevant knowledge in the chemical field during its daily use, and construct these related knowledge in the chemical field into the chemical knowledge graph on basis of natural language processing, big data and artificial intelligence technology, thereby further improving the comprehensiveness, accuracy and real-time performance of the chemical knowledge in the chemical knowledge graph.

Figure 3:
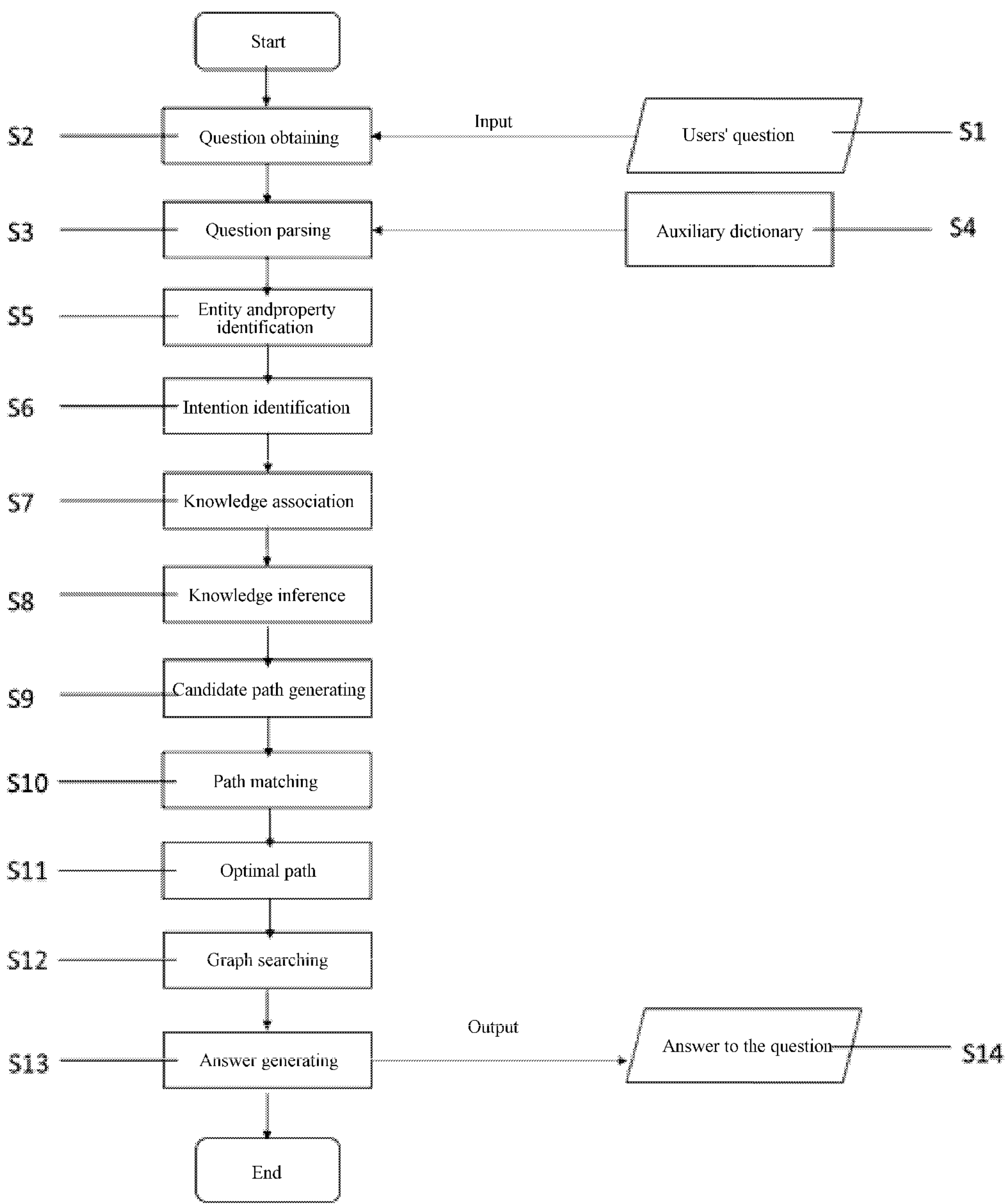
FIG. 3 shows a flowchart for performing intelligent question answering according to some embodiments of the disclosure.

Please further refer to FIG. 3. FIG. 3 shows a flowchart for performing intelligent question answering according to some embodiments of the disclosure.

As shown in FIG. 1 and FIG. 3, after completing the construction of the chemical knowledge graph, the intelligent question answering device 10 can quickly and accurately provide a corresponding answer to the question in the chemical field, raised by the user, on basis of the constructed chemical knowledge graph.

Specifically, in the process of intelligent question answering for chemical knowledge, the intelligent question answering device 10 can first obtain a user input question, through a human-computer interaction interface such as a keyboard or a microphone, and then use a question pre-processing module 12 to parse the question to identify the question entity data and question property data related to chemical knowledge, and identify the intention of the question. In some embodiments, the steps of the question parsing can be implemented through a pre trained question parsing module. Specifically, for the voice data input by the user through the microphone, the intelligent question answering device 10 can first use a pre trained speech recognition module and a semantic recognition module to convert the voice data into corresponding text data, and then input the converted text data into the pre trained question parsing module to identify the entity data and property data related to chemical knowledge, and identify the intention of the question.

It can be understood that the above speech recognition module and semantic recognition module are existing technologies in this field and will not be further described here. As for the question parsing module mentioned above, a deep learning model can be chosen. Technicians can first create a large number of chemical knowledge question samples by annotating relevant knowledge in the chemical field, and then train the question parsing module according to these chemical knowledge question samples to obtain the function of identifying entity data and property data from chemical knowledge. As mentioned above, property data can comprise relation property data and numeric property data, wherein the relation property data is used to describe the relation property between two corresponding entities, and the numeric property data is used to describe a type of property value of a corresponding entity.

For example, in response to the question of "how is the undersized reflux rate of fractionator C-9102 caused" raised by the user, the question parsing module can identify the entity data of "undersized reflux rate of fractionator C-9102" and the property data of "how is . . . caused".

In order to avoid the difficulty of using household registration language to associate with standardized chemical knowledge data in the chemical knowledge graph, the intelligent question answering device 10 can use an auxiliary dictionary module 15 to further map and transform the entity data and property data obtained from recognition. In some embodiments, the auxiliary dictionary module 15 can be configured with an entity link dictionary and a property dictionary. In response to the identification of the entity data of "undersized reflux flow rate of fractionation tower C-9102" from the question, the intelligent question answering device 10 can first call the entity link dictionary to check whether there are synonyms of the entity data recorded in it.

If a synonym for the entity data is recorded in the entity link dictionary, the intelligent question answering device 10 can use this synonym to replace the entity data, so as to map the question entity data into data consistent with the description of the chemical knowledge graph. On the contrary, if there is no synonym for the entity data recorded in the entity link dictionary, the intelligent question answering device 10 can further use machine learning fuzzy matching technology to query relevant records that comply with fuzzy matching rules from the entity link dictionary, and use the fuzzy matching related records (such as "undersized reflux flow rate at the bottom of fractionation tower C-9102") to replace the entity data, so as to map the entity data of the question to data consistent with the description of the chemical knowledge graph. Similarly, in response to identifying the property data of "how is . . . caused" from the question, the intelligent question answering device 10 can also call the property dictionary and map the property data of "how is . . . causes" to the property data of "reason" recorded in the knowledge graph according to synonyms and/or machine learning fuzzy matching technology.

Afterwards, the question parsing module can identify the intention of the question according to the identified question entity data and question property data. Specifically, for the above embodiment, in response to identifying a question entity data related to chemical knowledge from the question (i.e. "undersized reflux flow at the bottom of fractionator C-9102"), as well as a corresponding question property data (i.e. "reason"), the question parsing module can determine that the intention of the question is to retrieve the corresponding second entity according to the first entity and property. Optionally, in other embodiments, the question parsing module can also respond to identifying two question entity data related to chemical knowledge from the question, and determine that the intention of the question is to retrieve corresponding property according to the first and second entities, which will not be described here.

As shown in FIG. 1 and FIG. 3, after identifying the entity data, property data and intention involved in the question, the intelligent question answering device 10 can use the question analysis and inference module 13 to first associate the output of the question pre-processing module 12 with the knowledge in the chemical knowledge graph, and then combine it with the relevant standard knowledge representation in the chemical knowledge graph for knowledge inference, so as to obtain candidate paths for obtaining the answer to the question.

Specifically, the question analysis and inference module 13 can first query the chemical knowledge graph according to the entity data of the question, so as to associate it with the corresponding first graph entity data in the chemical knowledge graph, and then determine the plurality of standard knowledge representations related to the first graph entity data in the chemical knowledge graph. Afterwards, the question analysis and inference module 13 can select all of the second graph property data that are related to the first graph entity data, according to the intention of retrieving the corresponding second entity according to the first entity and the property mentioned above, and then combine the first graph entity data with each second graph property data to obtain a plurality of candidate paths.

For example, in the embodiment of "undersized reflux flow rate at the bottom of fractionation tower C-9102" mentioned above, the question analysis and inference module 13 can first associate it with the first graph entity data of "undersized reflux flow rate at the bottom of fractionation tower C-9102" that is recorded in the chemical knowledge graph, and then query all standard knowledge representations related to the first graph entity data in the chemical knowledge graph. In some embodiments, the standard knowledge representations related to the first graph entity data of "undersized reflux flow rate at the bottom of fractionation tower C-9102" can comprise: "undersized reflux flow rate at the bottom of fractionation tower C-9102, reason, fault of the reflux flow rate control circuit FIC9133 at the bottom of fractionation tower C-9102"; "undersized reflux flow rate at the bottom of fractionation tower C-9102, consequence, coking at the bottom of fractionation tower C-9102 and causing fluctuations in the feed flow rate of the heating furnace"; and "undersized reflux flow rate at the bottom of fractionation tower C-9102, safety precaution, setting a low feed flow interlock that extinguishes the main fire nozzle of the group of heating furnaces when the feed flow rate is below 27.5 T/H in the heating furnace F9101".

Afterwards, the question analysis and inference module 13 can select all the second graph property data related to the first graph entity data (i.e. the "reason", "consequence" and "safety precaution" mentioned above) from the queried standard knowledge representation, according to the intention of retrieving the corresponding second entity according to the first entity and property, so as to construct a plurality of candidate paths. Specifically, the question analysis and inference module 13 can combine the first graph entity data of "undersized reflux flow rate at the bottom of fractionation tower C-9102" with the second graph property data of "reason" to form the first candidate path of "reason of undersized reflux flow rate at the bottom of fractionation tower C-9102"; combine the first graph entity data of "undersized reflux flow rate at the bottom of fractionation tower C-9102" and the second graph property data of "consequence" to form the second candidate path of "consequence of undersized reflux flow rate at the bottom of fractionation tower C-9102"; and also combine the first graph entity data of "undersized reflux flow rate at the bottom of fractionation tower C-9102" and the second graph property data of "safety precaution" to form the third candidate path of "safety precaution of undersized reflux flow rate at the bottom of fractionation tower C-9102".

Furthermore, in some embodiments, the second graph property data related to the first graph entity data not only includes the first degree related second graph property data (i.e., the second graph property data that can be associated with the first graph entity data through one standard knowledge representation), but also includes second graph property data that is second degree related to the first graph entity data (i.e., the second graph property data that requires two standard knowledge representations to be associated with the first graph entity data). For example, for the standard knowledge representation of "undersized reflux flow rate at the bottom of fractionation tower C-9102, reason, fault of the reflux flow rate control circuit FIC9133 at the bottom of fractionation tower C-9102" and "fault of the reflux flow rate control circuit FIC9133 at the bottom of fractionation tower C-9102, consequence, valve FV9133 being turned down", the question analysis and inference module 13 can further infer and obtain new knowledge of "undersized reflux flow rate at the bottom of fractionation tower C-9102, reason, valve FV9133 being turned down", and determine the second graph property data that is second degree related to the first graph entity data to be "reason", according to this new knowledge. Afterwards, the question analysis and inference module 13 can combine the first graph entity data of "undersized reflux flow rate at the bottom of fractionation tower C-9102" with the second degree related second graph property data of "reason" to form the fourth candidate path of "reason of undersized reflux flow rate at the bottom of fractionation tower C-9102".

Those skilled in the art can understand that the proposal of generating a plurality of candidate paths according to the intention of retrieving the corresponding second entity according to the first entity and the property mentioned above, is only a non-limiting embodiment provided by the disclosure, which is intended to clearly display the main idea of the disclosure, and provide some specific proposals that are convenient for the public to implement, rather than limiting the scope of protection of the disclosure.

Optionally, in other embodiments, according to the intention of retrieving corresponding property according to the first and second entities mentioned above, the question analysis and inference module 13 can first query the chemical knowledge graph, according to the first graph entity data, to determine a plurality of standard knowledge representations related to the first graph entity data. Afterwards, the question analysis and inference module 13 can select all second graph entities that are first degree or second degree related to the first graph entity data according to the intention of retrieving the corresponding second entity according to the first entity and property mentioned above, through the plurality of standard knowledge representations. The first degree related second graph entity refers to that the first graph entity data can be associated with the second graph entity data through one standard knowledge representation. The second degree related second graph entity refers to that the first graph entity data can be associated with the second graph entity data through two standard knowledge representations. Afterwards, the question analysis and inference module 13 can combine the first graph entity data with the selected second graph entity data to form a plurality of candidate paths. The combination manner of these candidate paths is the same as the above embodiments, and will not be described here.

As shown in FIG. 1 and FIG. 3, after generating the plurality of candidate paths, the intelligent question answering device 10 can use the question post-processing module 14 to carry out paths matching of the plurality of candidate paths to determine the optimal search path among them. Afterwards, the question post-processing module 14 searches the chemical knowledge graph according to the optimal search path to obtain the corresponding answer to the question.

Specifically, for the embodiment of "undersized reflux flow rate at the bottom of fractionation tower C-9102" mentioned above, the question post-processing module 14 can first input the text of the question raised by the user into a word vector model, pre trained according to chemical knowledge samples, to obtain the first text vector corresponding to the question. Afterwards, the question post-processing module 14 can input the first to fourth candidate paths into the word vector model separately to obtain the second vectors of each candidate path. Afterwards, the question post-processing module 14 can calculate the cosine values of each second vector and the first vector separately, to serve as the text matching degree between each candidate path and the question.

In the above embodiment, according to the question text of "What is the reason of the undersized reflux flow rate of fractionation tower C-9102", the text matching degree of the first candidate path of "reason of undersized reflux flow rate at the bottom of fractionation tower C-9102" is 0.98, the text matching degree of the second candidate path of "consequence of undersized reflux flow rate at the bottom of fractionation tower C-9102" is 0.85, the text matching degree of the third candidate path of "safety precaution of low reflux flow rate at the bottom of fractionation tower C-9102" is 0.74, and the text matching degree of the fourth candidate path of "reason of undersized reflux flow rate at the bottom of fractionation tower C-9102" is also 0.98.

In this way, the question post-processing module 14 can select the first and fourth candidate paths with the highest text matching degree, according to the ranking of the text matching degree (i.e. entity: undersized reflux flow rate at the bottom of fractionation tower C-9102; property: reason) as the optimal search path. Afterwards, the question post-processing module 14 can search for the chemical knowledge graph according to the optimal search path, to determine the corresponding standard knowledge representation, namely "undersized reflux flow rate at the bottom of fractionation tower C-9102, reason, fault of the reflux flow rate control circuit FIC9133 at the bottom of fractionation tower C-9102" and "undersized reflux flow rate at the bottom of fractionation tower C-9102, reason, valve FV9133 being turned down". Afterwards, the question post-processing module 14 can determine that the answer is located in the second entity of the relevant standard knowledge representation, according to the intention of retrieving the corresponding second entity according to the first entity and property mentioned above, namely "fault of the reflux flow rate control circuit FIC9133 at the bottom of fractionation tower C-9102" and "valve FV9133 being turned down". Finally, the post-processing module 14 can organize the obtained answers according to the above questions to obtain the standard form answer of "Fault of the reflux flow rate control circuit FIC9133 at the bottom of fractionation tower C-9102 causes valve FV9133 to turn down", and return the standard form answer to the user through the human-machine interaction interface such as a speaker or a display screen.

In this way, the intelligent question answering device 10 provided by the disclosure can combine chemical knowledge graph and natural language processing technology in the field of chemical to provide intelligent question answering functions for those skilled in the field of chemical industry. Compared to existing technologies that implement intelligent question answering on basis of retrieval technology or deep learning matching technology, the disclosure combines chemical knowledge graph to carry out inference based intelligent question answering, which can more accurately and efficiently understand the real needs of those skilled in the art in the chemical industry, assist them in decision-making and quickly solve complex questions, thereby reducing the incidence of safety accidents and better safeguarding the benefits of the enterprises and the country.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein, but can be understood by those skilled in the art.

Those skilled in the art will understand that information, signals and data can be represented by using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

Those skilled in the art will further appreciate that various illustrative logic blocks, modules, circuits and algorithm steps described in combination with the embodiments disclosed herein can be implemented as electronic hardware, computer software or a combination of both. In order to clearly explain the interchangeability of hardware and software, various illustrative components, blocks, modules, circuits and steps are generally described above in the form of their functionality. Whether such functionality is implemented as hardware or software depends on the specific application and design constraints imposed on the overall system. Technicians can implement the described functionality in different ways for each specific application, but such implementation decisions should not be interpreted as leading to departure from the scope of the disclosure.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, a plurality of microprocessors, one or more microprocessors cooperating with the DSP core or any other such configuration.

The previous description of the disclosure is provided to enable any person skilled in the art to make or use the disclosure. Various modifications to the disclosure will be apparent to those skilled in the art, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

The invention claimed is:

1. An intelligent question answering method for chemical knowledge, comprising:

obtaining a question inputted by a user through a human-computer interaction interface, wherein the question is related to an abnormal operating condition in a chemical process;

inputting the question into a pre-trained deep learning module to obtain a question entity data and a question property data related to the chemical knowledge thereof, and identifying an intention of the question, wherein the deep learning model is trained on question samples according to the chemical knowledge;

using a question analysis and inference module to determine a first graph entity data associated with the question entity data from each graph entity data of a chemical knowledge graph;

when the intention of the question is to retrieve a corresponding property according to a first entity and a second entity, performing the following:

selecting all second graph entity data that are once related or twice related to the first graph entity data according to a standard knowledge representation in the chemical knowledge graph, wherein a relationship of once related refers to the first graph entity data that can be associated with the second graph entity data through one standard knowledge representation, and a relationship of twice related refers to the first graph entity data that can be associated with the second graph entity data through two standard knowledge representations; and respectively combining the first graph entity data with each of selected second graph entity data to obtain a plurality of candidate paths;

using a question post-processing module to perform the following:

inputting the question into a word vector model pre-trained on a basis of chemical knowledge samples to obtain a first vector of the question;

respectively inputting the plurality of candidate paths into the word vector model to obtain a second vector of each;

respectively calculating a cosine value between each second vector and each first vector to serve as a text matching degree between each of the plurality of candidate paths and the question, and selecting a candidate path with a highest text matching degree as an optimal search path; and searching the chemical knowledge graph according to the optimal search path to obtain an answer corresponding to the question, wherein the answer provides a cause, a consequence, or a safety precaution associated with the abnormal operating condition; and returning the answer in a standard form through the human-computer interaction interface.

2. The intelligent question answering method according to claim 1, wherein the pre-trained deep learning module comprises an entity link dictionary and a property dictionary, steps of identifying the question entity data and the question property data related to the chemical knowledge thereof further comprise:

inputting the obtained question entity data into the entity link dictionary, and mapping the question entity data to data consistent with a description of the chemical knowledge graph according to synonyms and/or machine learning fuzzy matching; and inputting the obtained question property data into the property dictionary, and mapping the question property data to data consistent with the description of the chemical knowledge graph according to synonyms and/or machine learning fuzzy matching.

3. The intelligent question answering method according to claim 1, wherein steps of identifying the intention of the question comprise:

in response to identifying the question entity data related to the chemical knowledge and a corresponding question property data from the question, determining that the intention of the question is to retrieve a corresponding second entity according to a first entity and a property; and in response to identifying two question entity data related to the chemical knowledge from the question, determining that the intention of the question is to retrieve a corresponding property according to the first entity and the second entity.

4. The intelligent question answering method according to claim 1, wherein steps of searching the chemical knowledge graph according to the optimal search path to obtain the answer corresponding to the question comprise:

searching the chemical knowledge graph according to the optimal search path to determine a corresponding standard knowledge representation;

determining a position of the answer in the standard knowledge representation according to the intention of the question; and organizing the answers according to the question to obtain the answer in a standard form.

5. The intelligent question answering method according to claim 4, further comprising a following step:

returning the answer in the standard form to the user.

6. The intelligent question answering method according to claim 1, wherein before obtaining the question raised by the user, the intelligent question answering method further comprises following steps:

obtaining a knowledge data in a chemical field;

pre-processing the knowledge data to obtain an entity data and a property data related to the chemical knowledge;

determining a preliminary knowledge representation according to the entity data and the property data;

performing entity alignment on the preliminary knowledge representation to obtain the standard knowledge representation; and constructing the chemical knowledge graph according to the standard knowledge representation.

7. The intelligent question answering method according to claim 6, wherein the knowledge data comprises a structured data, a semi-structured data and/or an unstructured data, and steps of pre-processing the knowledge data comprise:

integrating the structured data to obtain the entity data and the property data related to the chemical knowledge; and/or performing knowledge extraction on the semi-structured data and/or the unstructured data to obtain the entity data and the property data related to the chemical knowledge.

8. The intelligent question answering method according to claim 7, wherein the property data comprises a numeric property data and a relation property data, wherein the numeric property data is used to describe a property value of one entity data in one preliminary knowledge representation, and the relation property data is used to describe a relationship between two entity data in the one preliminary knowledge representation.

9. The intelligent question answering method according to claim 8, wherein step of determining the preliminary knowledge representation according to the entity data and the property data comprises:

constructing the preliminary knowledge representation in a triplet form according to the obtained entity data and property data in a form of entity-numeric property-property value, or first entity-relation property-second entity.

10. The intelligent question answering method according to claim 6, wherein steps of performing entity alignment on the preliminary knowledge representation to obtain the standard knowledge representation comprise:

analyzing a plurality of the preliminary knowledge representations to determine a plurality of different entity data indicating one chemical entity; and decomposing the plurality of different entity data indicating the one chemical entity into the same entity data to obtain the standard knowledge representation that utilizes the same entity data to indicate the same chemical entity.

11. The intelligent question answering method according to claim 6, wherein steps of constructing the chemical knowledge graph according to the standard knowledge representation comprise:

performing knowledge discovery according to the entity data and the property data of the plurality of standard knowledge representations to obtain at least one high-credibility standard knowledge representation;

performing knowledge inference according to the entity data and the property data of the plurality of standard knowledge representations to obtain a plurality of standard knowledge representations with unknown credibility;

evaluating a quality of the plurality of standard knowledge representations with unknown credibility to determine the high-credibility standard knowledge representation thereof, and constructing the chemical knowledge graph according to each of the high-credibility standard knowledge representations.

12. The intelligent question answering method according to claim 11, wherein steps of evaluating the quality of the plurality of standard knowledge representations with unknown credibility comprise:

performing text matching between the plurality of standard knowledge representations with unknown credibility and the knowledge data in the chemical field to obtain the text matching degree of each standard knowledge representation; and determining the standard knowledge representation with the text matching degree that is higher than a preset matching degree threshold as a high-credibility standard knowledge representation.

13. An intelligent question answering device for chemical knowledge, comprising:

a memory having computer-readable instructions stored thereon; and a processor that is connected to the memory, wherein the instructions, when executed by the processor, allow the processor to obtain a question inputted by a user through a human-computer interaction interface, wherein the question is related to an abnormal operating condition in a chemical process;

input the question into a pre-trained deep learning to obtain a question entity data and a question property data related to the chemical knowledge thereof, and identifying an intention of the question, wherein the deep learning model is trained on question samples according to the chemical knowledge;

use a question analysis and inference module to determine a first graph entity data associated with the question entity data from each graph entity data of a chemical knowledge graph;

when the intention of the question is to retrieve a corresponding property according to a first entity and a second entity, performing the following:

select all second graph entity data that are once related or twice related to the first graph entity data according to a standard knowledge representation in the chemical knowledge graph, wherein a relationship of once related refers to the first graph entity data that can be associated with the second graph entity data through one standard knowledge representation, and a relationship of twice related refers to the first graph entity data that can be associated with the second graph entity data through two standard knowledge representations; and respectively combine the first graph entity data with each of selected second graph entity data to obtain a plurality of candidate paths;

use a question post-processing module to perform the following:

input the question into a word vector model pre-trained on a basis of chemical knowledge samples to obtain a first vector of the question;

respectively input the plurality of candidate paths into the word vector model to obtain a second vector of each;

respectively calculate a cosine value between each second vector and each first vector to serve as a text matching degree between each of the plurality of candidate paths and the question, and selecting a candidate path with a highest text matching degree as an optimal search path; and search the chemical knowledge graph according to the optimal search path to obtain an answer corresponding to the question, wherein the answer provides a cause, a consequence, or a safety precaution associated with the abnormal operating condition; and return the answer in a standard form through the human-computer interaction interface.

14. A non-transitory computer-readable storage medium having computer instructions therein, wherein the computer instructions are configured to cause a computer to at least:

obtain a question inputted by a user through a human-computer interaction interface, wherein the question is related to an abnormal operating condition in a chemical process;

input the question into a pre-trained deep learning module to obtain a question entity data and a question property data related to the chemical knowledge thereof, and identifying an intention of the question, wherein the deep learning model is trained on question samples according to the chemical knowledge;

use a question analysis and inference module to determine a first graph entity data associated with the question entity data from each graph entity data of a chemical knowledge graph;

when the intention of the question is to retrieve a corresponding property according to a first entity and a second entity, performing the following:

select all second graph entity data that are once related or twice related to the first graph entity data according to a standard knowledge representation in the chemical knowledge graph, wherein a relationship of once related refers to the first graph entity data that can be associated with the second graph entity data through one standard knowledge representation, and a relationship of twice related refers to the first graph entity data that can be associated with the second graph entity data through two standard knowledge representations; and respectively combine the first graph entity data with each of selected second graph entity data to obtain a plurality of candidate paths;

use a question post-processing module to perform the following:

input the question into a word vector model pre-trained on a basis of chemical knowledge samples to obtain a first vector of the question;

respectively input the plurality of candidate paths into the word vector model to obtain a second vector of each;

respectively calculate a cosine value between each second vector and each first vector to serve as a text matching degree between each of the plurality of candidate paths and the question, and selecting a candidate path with a highest text matching degree as an optimal search path; and search the chemical knowledge graph according to the optimal search path to obtain an answer corresponding to the question, wherein the answer provides a cause, a consequence, or a safety precaution associated with the abnormal operating condition; and return the answer in a standard form through the human-computer interaction interface.

* * * * *